United States Patent
Christofferson et al.

(10) Patent No.: US 7,487,291 B1
(45) Date of Patent: Feb. 3, 2009

(54) METHODS FOR RESTRICTED UPDATE SHARING OF REMOVABLE MEDIA IN A MEDIA LIBRARY

(75) Inventors: Armin H. Christofferson, Rochester, MN (US); James L. Tilbury, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/108,997

(22) Filed: Apr. 24, 2008

(51) Int. Cl.
*G06F 12/08* (2006.01)

(52) U.S. Cl. ............... 711/113; 711/114; 711/133; 711/152

(58) Field of Classification Search ............... None
See application file for complete search history.

(56) References Cited

U.S. PATENT DOCUMENTS 5,764,972 A   6/1998   Crouse et al.

2007/0168398 A1*   7/2007   Miroshnichenko et al. .. 707/200

\* cited by examiner

*Primary Examiner*—Gary J Portka
(74) *Attorney, Agent, or Firm*—Cantor Colburn LLP

(57) ABSTRACT

A method is provided for restricted update sharing of removable media in a media library. Media is allowed to be retrieved from storage slots of a media library and moved to a drive in a restricted update mode. The media includes short term attributes that include short term media data structures, and long term attributes. A file system includes short term memory and long term memory associated with the media. Updates to the long term attributes and long term memory are restricted. Updates to the short term attributes and the short term memory are allowed. The short term memory of the file system is refreshed each time the media is moved to the drive, which includes changing data in the short term memory back to an original state and rebuilding the data in the short term memory from the media data structures of the short term attributes.

2 Claims, 6 Drawing Sheets

File System Rules: An existing file system must cache information from a previous move to drive, such as the expected volume ID. The file system may keep additional information such as free and used space records, frequently used directory structures, and other shortcut information for performance reasons.

A traditional file system showing only controller access methods and cached data examples

METHODS FOR RESTRICTED UPDATE SHARING OF REMOVABLE MEDIA IN A MEDIA LIBRARY

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to media in a media library, and particularly to techniques for updating removable media in a media library.

2. Description of Background

In today's computer driven environment, storage of media is an important aspect to consider. For example, media that is stored in a non-intelligent media library has its file system information managed by a controlling server. Sharing this media, when more than one server has access, normally is restricted to read only mode. Implementations allowing updates to this media normally block all other systems from the media until a "checkpoint" is reached. Also, problems with updates include issues such as renaming a mount point, invalidating cached file information, and other complex issues.

FIG. 1 illustrates a traditional implementation of a library controller layer. This process is responsible for moving media such as a tape or optical volume into the data transport element (such as an optical drive). This process is responsible for identifying what is obviously new media (i.e., from the import/export station) from media that should be known (i.e., from a storage slot).

FIG. 2 illustrates a portion of a typical file system with the methods implemented to allow the file system to support a media library implementation. For performance reasons, most file systems maintain a memory copy of frequently accessed data from the media, such as the volume label or volume identifier, the creation date, knowledge of free and used spaces, directory structures, and other information needed to manage the directory. This is well understood by anyone versed in file system implementations. The mount method is unique for media libraries and allows the library controller to ask the file system to verify that the correct physical media was moved into the data transport element (drive).

The controlling system adds media to the media library. Part of this add includes moving the media into a drive and reading file system information from the media (NEW in FIG. 2). This information includes various data, and one item is the "Name" (VOLUME ID) of the media. On system the IBM System i5™ server, this name is registered as part of the file system. For example, if the name is PAYROLL, you would access the data on this media by accessing "/QOPT/PAYROLL". So this name should not be changed for the duration of the time (perhaps months) that the media is known to the system. To detect a critical hardware problem (such as a robotic error that grabs the wrong media) or a user attempting to be helpful and hand move media, the controlling system needs to validate that the correct media is moved to a drive. This is done by asking the file system to validate the media, which it does by checking that the name on the media matches the expected name.

A second critical piece of information is the record of free and used media space. The file system may choose to pre-allocate media space in the free and used space records on the media and manage that pre-allocated space from its cached information until used up. This approach avoids expensive I/O operations to update the free and used space records on the media, and conserves space within the record structures in the case of permanent WORM media (where sectors can only be written once).

However, this information is not externalized from the file system, so there needs to be a way to recognize that another file system has made updates to the free and used space records on the media or control those updates within a set of checkpoints. Also, current practices have other problems associated with media updates (related to information that is cached) when sharing media. It would be beneficial to have techniques for detecting and controlling the updates of file system structures on the media when that media is being shared in a media library.

SUMMARY OF EXEMPLARY EMBODIMENTS

In accordance with exemplary embodiment, a method is provided for restricted update sharing of removable media in a media library. Media is allowed to be retrieved from storage slots of a media library and moved to a drive in a restricted update mode. The media includes short term attributes that include short term media data structures, and long term attributes. A file system is provided that comprising a short term memory and a long term memory associated with the media. Updates to the long term attributes of the media are restricted. Updates to the long term memory of the file system are restricted, and the long term memory corresponds to the long term attributes of the media. Updates to the short term attributes of the media are allowed. Updates to the short term memory of the file system are allowed, and the short term memory corresponds to the short term attributes of the media. The short term memory of the file system is refreshed each time the media is moved to the drive. Refreshing the short term memory of the file system includes changing data in the short term memory back to an original state for the data in the short term memory and refreshing the short term memory includes rebuilding the data in the short term memory from the media data structures of the short term attributes each time the media is moved to the drive.

Further, exemplary embodiments may include allowing multiple servers to access the media of the media library in the restricted update mode, where the multiple servers each comprise a file system, and the multiple servers each respectively update their short term memory by making changes thereto. The short term memory for the plurality of servers is respectively refreshed each time the media is moved to the drive.

System and computer program products corresponding to the above-summarized methods are also described herein.

Additional features and advantages are realized through the techniques of the present invention. Exemplary embodiments of the invention are described in detail herein and are considered a part of the claimed invention. For a better understanding of features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features and advantages are apparent from the following detailed description taken in conjunction with the accompanying drawings in which:

The detailed description explains exemplary embodiments, together with advantages and features, by way of example with reference to the drawings.

DETAILED DESCRIPTION OF EXEMPLARY EMBODIMENTS

This disclosure provides a system to "use" the media by taking it over when the media is in a storage slot, moving it to a drive, performing reads and/or writes, and returning the media to the storage slot to free it up for other systems/users. A short term memory and a long term memory associated with the media and file system are provided. All servers are allowed to cache the long term attributes of the media, but no updates to these long term attributes and associated long term memory are allowed. All servers are allowed to cache short term information for management of media resources and file system data structures, and updates to this short term information and associated short term memory are allowed. The short term memory is refreshed each time the media is moved into the drive.

In accordance with exemplary embodiments, a media library is a unit that contains controlling and network attachment components, and four types of elements: (1) import/export (mail slot), (2) storage slots (or bins), (3) media movers (e.g., the "hand" that grabs and moves the media) also known as a picker or robot, and (4) data transfer elements (I/O drives).) In exemplary embodiments, updates to long term memory of the file system are restricted to cases where the media is being added or removed from the library, or when the basic information is totally changed (e.g., reformatting the media). Updates to short term memory are allowed by the system currently using the media, and this information must be refreshed whenever the media is moved by a using system from a storage element to a drive (referred to as mount).

Figure 5:
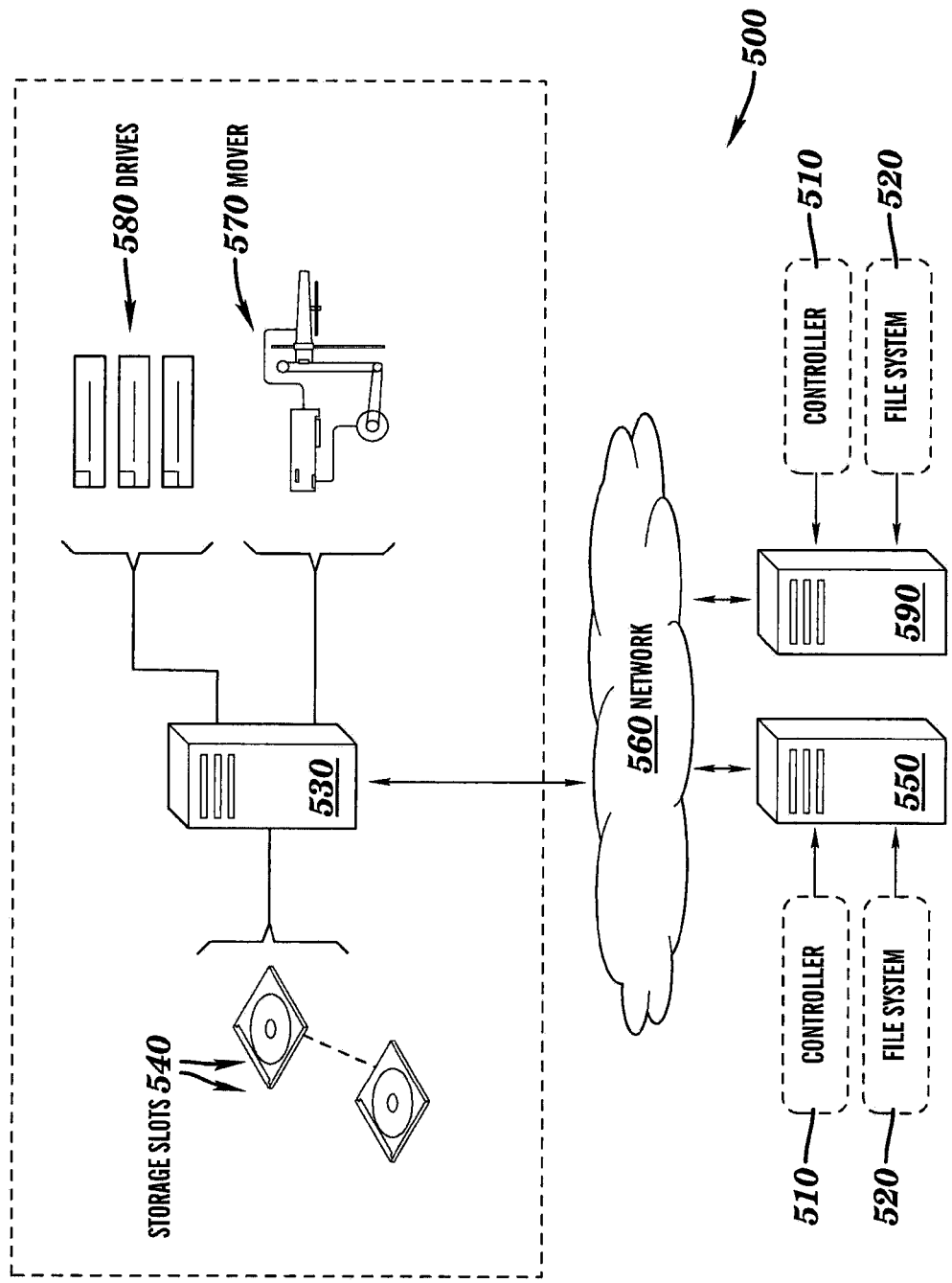
FIG. 5 illustrates a system in accordance with exemplary embodiments.

Now turning to the drawings in greater detail, FIG. 5 illustrates a system 500 in accordance with exemplary embodiments. A controller 510 and a file system 520 may reside on one or more servers such as host servers 550 and 590. The controller 510 and the file system 520 may be implemented as applications, modules, etc. The media library 530 is coupled to a plurality of storages such as the storage slots 540. The media library 530 and the storage slots 540 are configured to store and manage media. A mover 570 may be used to move media from the storage slots 540 to a plurality of drives 580. One or more servers 550 may be operatively connected to the media library 530 to access media via a network 560.

In accordance with exemplary embodiments, access to the network 560 is not meant to be limiting in any way. The network 560 may include circuit-switched and/or packet-switched technologies and devices, such as routers, switches, hubs, gateways, etc., for facilitating communications over the network 560. The network 560 may include wireline and/or wireless components utilizing, e.g., IEEE 802.11 standards for providing over-the-air transmissions of communications. The network 560 can include IP-based networks and can facilitate communications over the Internet. In exemplary embodiments, the network 560 can be a managed IP network administered by a service provider, which can control bandwidth and quality of service for communications discussed herein.

Also, the media library 530 and the host servers 550 and 590 may be implemented using a high-speed processing device (e.g., a computer system) that is capable of handling high volume activities conducted with network entities via the network 560.

Figure 1:
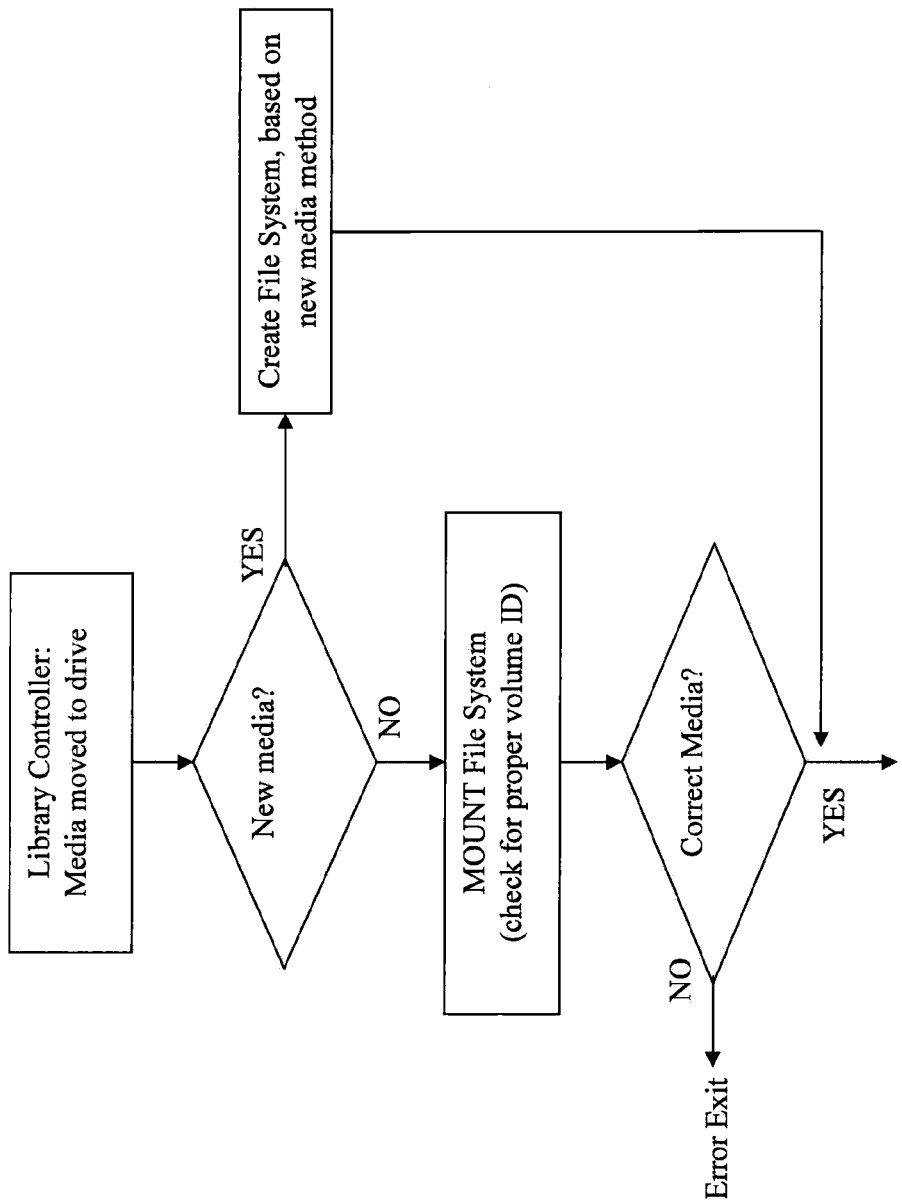
FIG. 1 illustrates a typical implementation of a library controller layer.

Furthermore, exemplary embodiments are not limited to the exact configuration of the media library 530 and the host servers 550 and 590 but are capable of being implemented in the media library 530 and the host servers 550 and 590 illustrated in FIG. 5. Additionally, the media library 530 and the host servers 550 and 590 may be representative of numerous servers and computing devices. Likewise, the network 560 may be representative of numerous networks. Therefore, the system 500 illustrated in FIG. 1 is neither limited numerically to the elements depicted therein nor limited to the exact configuration and operative connections of elements. Further, it is understood by those skilled in the art that elements may be added to, subtracted from, or substituted for the elements described in the system 500 of FIG. 5.

Figure 3:
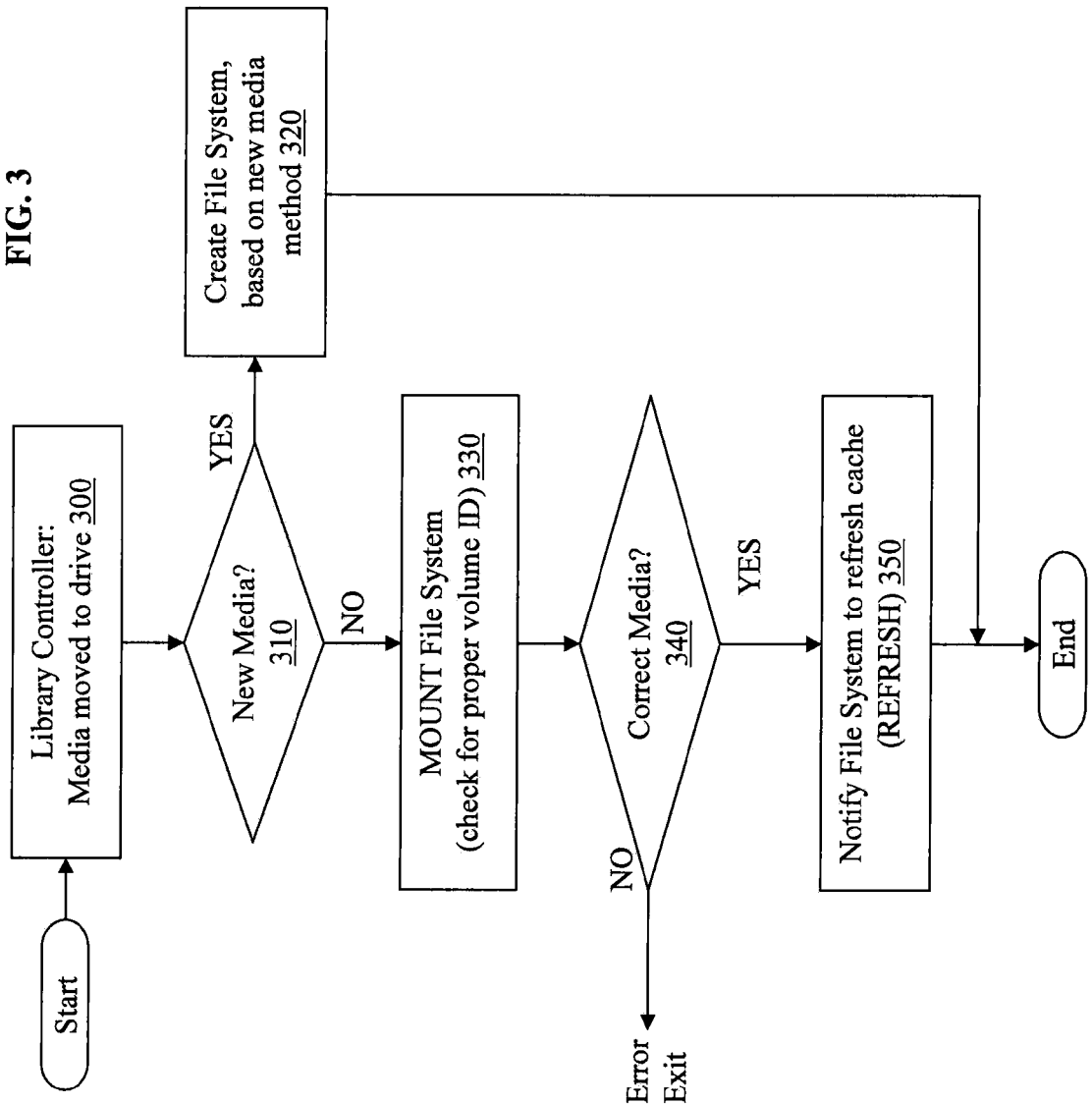
FIG. 3 illustrates a process for an improved library controller in accordance with exemplary embodiments.

FIG. 3 illustrates a process for an improved library controller 510 for restricted update in accordance with exemplary embodiments.

With regard to file system rules, the file system 520 is required to cache certain critical data read from the media when the media is added to the media library 530. The file system 520 needs to cache information from a previous move to drive (e.g., from storage slots 540 to the drives 580), such as the expected volume ID. Also, the file system 520 may keep additional information. However, in accordance with exemplary embodiments for improved sharing, the file system 520 is configured to allow short term information in a short term cache to be refreshed for restricted updates.

When media that may be shared with another controlling system (e.g., on the server 550) is updated since the last move to drive 580 from the storage slots 540 at 300, the controller 510 queries the file system 520 to validate whether the media is the proper media at 310.

If the media is new media, the new media is added to the file system 520 at 320. When media is added to the media library 530, there are no assumptions to be made about a media name. Likewise, the controller 510 may use any existing techniques to broadcast a message that the media is fundamentally changing (such as a low level format).

If the media is not new media, the controller 510 instructs the file system 520 to update any cached data that may have changed given the restricted update rules; the controller 510 also mounts the file system 520 and checks for a proper volume ID at 330. Whenever the file system 520 has prior knowledge that media is moved from the storage slot 540 to the drive 580, this move may be referred to as a mount.

The controller 510 determines if the media is correct at 340. If the media is not correct, there is an error and the process exits. For example, a user may hand examine the media and put the media back into the wrong storage slot 540. The controller 510 may want the file system 520 to update media named "PAYROLL", but the robot mover 570 moves the media thought to be payroll into the drive 580, and the name on the media is "EMPLOYEE_ADDRESS".

If the media is correct, the controller 510 instructs the file system 520 to refresh the short term (dynamic) cache at 350. Exemplary embodiments allow multiple systems to write to the media, if the multiple systems take turns and put the media back into the storage slot. The move from the storage slot to the drive (mount) will force the next system to update its short term cache.

Figure 2:
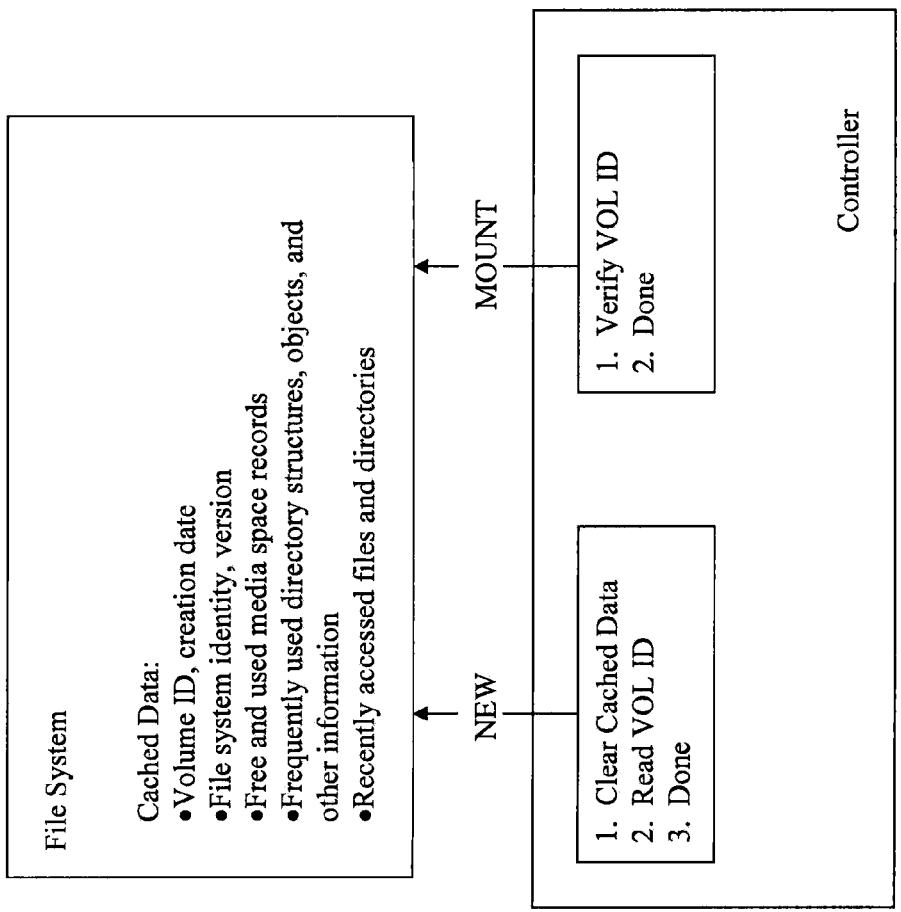
FIG. 2 illustrates a portion of a typical file system with the methods implemented to allow the file system to support a media library implementation.
Figure 4:
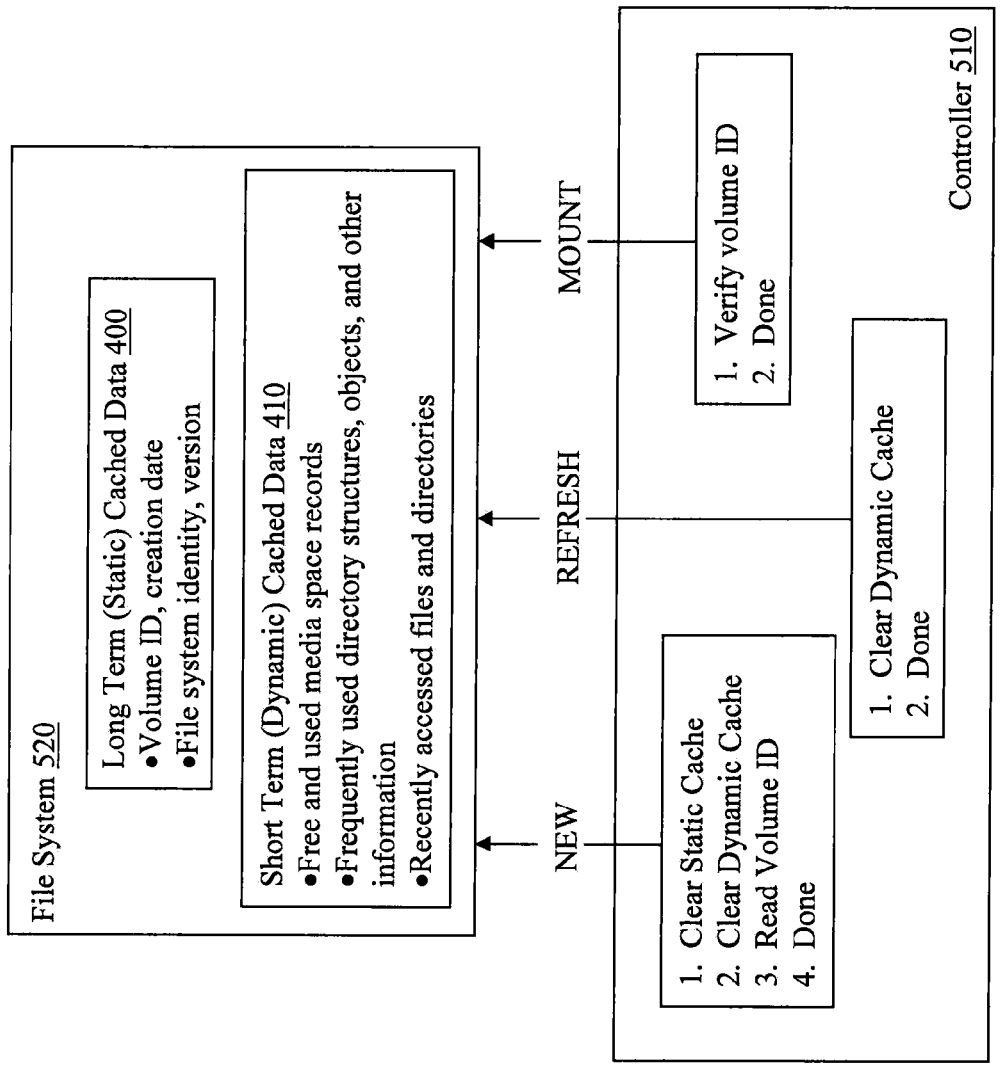
FIG. 4 illustrates an improved file system showing controller access methods and cached data examples for handling volumes in restricted update mode with the refresh method in accordance with exemplary embodiments.

FIG. 4 illustrates an improved file system (partial) 520 with controller access methods and cached data examples for handling volumes in restricted update mode with the refresh method in accordance with exemplary embodiments. Unlike the typical file system of FIGS. 1 and 2, the improved file system 520 handles volumes in restricted update mode in accordance with exemplary embodiments.

The file system may comprise restricted update rules. It is understood that there are a number of choices of what information may be cached in memory for any specific application. The controller 510 may control the file system 520 to implement the refresh process in accordance with exemplary embodiments. In exemplary embodiments, a static or long term cache 400 of the file system 520 may contain information identifying the volume and file system. This information is not allowed to change when the media is shared and is in restricted update mode of exemplary embodiments. Typical information stored in the static or long term cache 400 may include volume identifying information, such as the volume label, the creation date, the file system identity, and/or the file system version.

According to exemplary embodiments, a dynamic or short term cache 410 of the file system 520 may contain information used for active management of the file system structures. File system structures may depend on the particular file system being used, and what has been done in that file system to improve performance by preventing excess media reads. On some file systems this may include but not be limited to: location on the media of the end of written data; location on media of the last updated directory entry; number of files on the media; number of bytes of free space; and number of directories on the media. When the media is shared and is in restricted update mode of exemplary embodiments, this information must be re-constructed by reading from the media each time the media is locked in a physical drive (such as the drive 580) for read or write access. Information stored in the dynamic or short term cache 410 may also include free and used space records; frequently used directory structures, objects, and other information; and/or recently accessed files and directories.

If no caching is done, then the file system must read from the media any information it needs to traverse the file system. On optical storage media, this can take from 10 to 100 times as long as reading the same information from system DASD. Most modern file systems that access optical media may cache some type of data because the performance of large media like DVD or BluRay would be unacceptable without caching. However, traditional systems do not split that information into long term information and short term information to make sharing in a media library efficient in accordance with exemplary embodiments.

Exemplary embodiments of the present invention illustrate techniques, which may be referred to as restricted sharing, for allowing updates that solve many real world problems without the complexity introduced by traditional file sharing practices. As a non-limiting example, exemplary embodiments may be implemented in optical media libraries operatively connected to a server, such as the IBM System i™ server. Also, exemplary embodiments may be implemented any storage technology.

Access to optical volumes in a shared system environment can be accomplished via Fiber (Fibre) Channel Technology, multiple SCSI initiators, or any other number of existing attachment technologies. Normally, the system maintains cached information about the volume that is critical to achieving acceptable performance and managing media and file system resources. This includes knowledge of free and used spaces, directory objects that take multiple media accesses to construct, and other critical long term identifiers and attributes such as the volume name (which in the i™ server maps to the directory mount point).

Exemplary embodiments in the system 500 recognize and take into account that most updates to media, particularly in a storage solution that is archiving data, do not need to change the long term information (such as reinitializing the media, renaming the volume, or renaming existing directories), and certainly do not need to modify previously stored data. According to exemplary embodiments, we can mark such a volume of the storage slots 540 as "restricted update" by the controller 510.

The controller 510 may allow all systems (such as the server 550) to cache the long term attributes (e.g., in the long term cache 400) of the media from the file system 520, but no system (e.g., the server 550) that is accessing the media is allowed to change this long term information and previously stored data. The controller 510 may restrict updates (on the file system 520 for the storage slots 540) to adding new directories and new files only.

As a non-limiting example, all systems (such as the server 550) may be allowed to cache short term information (e.g., in the short term cache 410) for management of media resources and file system data structures from the file system 520, but such short term information must be re-constructed by reading from the media each time the media is locked in a physical drive for read or write access. This allows a system (such as the server 550) to add files to a media without large negative impacts on the implementation of file systems in the other systems that have access to this media. Although one may consider the result to be a less efficient use of media resources, this is an acceptable tradeoff to allow multiple system access to the storage slots 540.

Note that those skilled in the art would understand the process of "marking a volume as restricted update" and would understand that volume tables normally exist in a media changer, such as the mover 570. Also note that a concept of "dirty" on a file system could improve performance of mounting a volume significantly, but that is also a well-explored concept.

Figure 6:
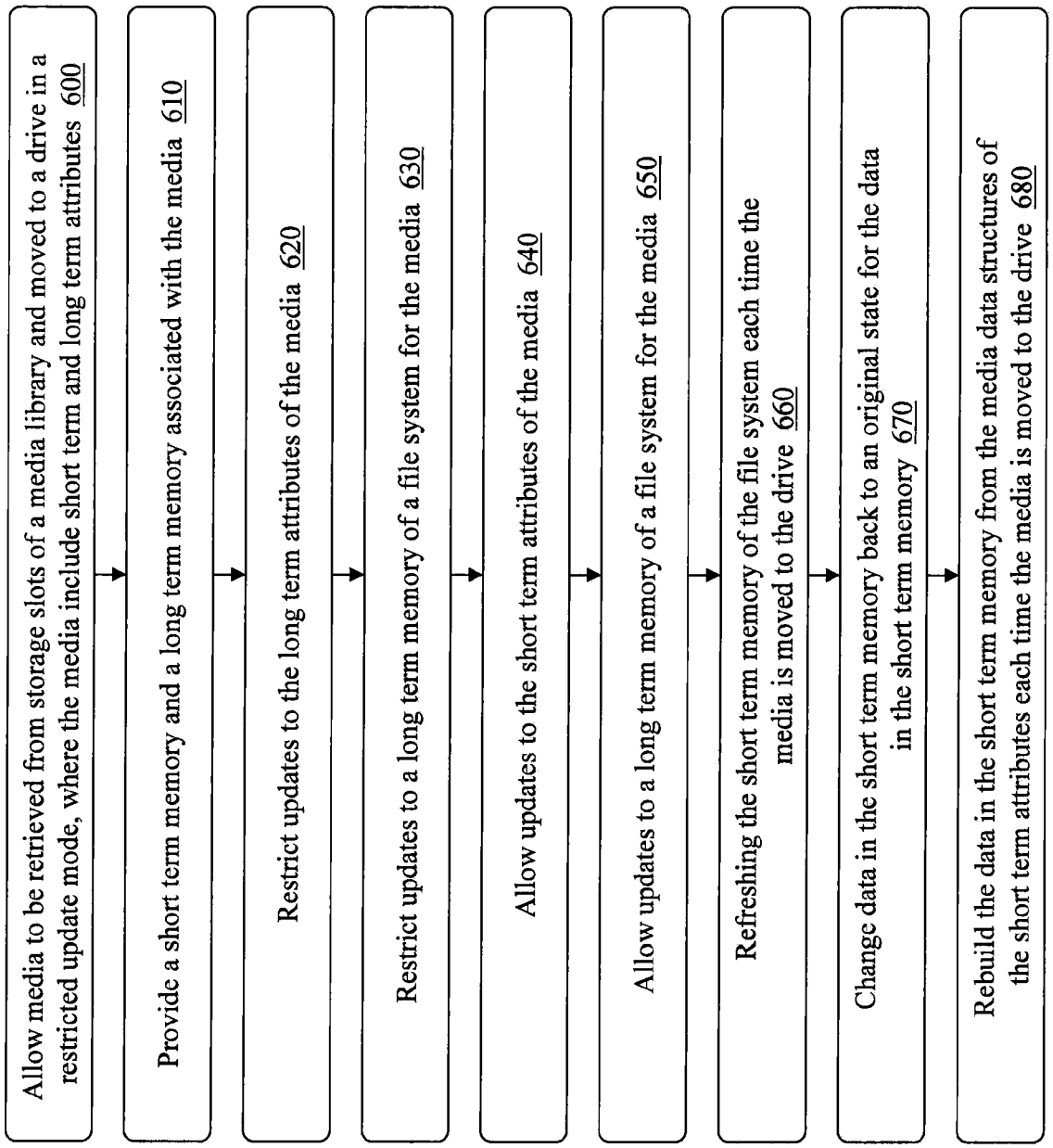
FIG. 6 illustrates a method for restricted update sharing of removable media in a media library in accordance with exemplary embodiments.

FIG. 6 illustrates a method for restricted update sharing of removable media in a media library in accordance with exemplary embodiments.

Media is allowed to be retrieved from storage slots of the media library 530 and moved to the drive 580 in a restricted update mode, where the media includes short term attributes that include short term media data structures and includes long term attributes at 600. The media may be shared in turn among a plurality of systems that can access the media library 530.

The file system 520 may be provided in the host servers 550 and 590, and the file system 520 includes a short term memory and a long term memory associated with the media at 610.

Updates to the long term attributes of the media are restricted at 620. Thus, changes cannot be made to the long term attributes of the media by the host servers 550 and 590.

Updates to the long term memory of the file system 520 are restricted, where the long term memory corresponds to the long term attributes of the media at 630. The controller 510 restricts updates to the long term memory (e.g., the long term cache 400) of the file system 520. Thus, the file system 520 cannot make changes to its long term memory. For example, the long term attributes of the media may be stored in the long term memory of the file system 520.

Updates to the short term attributes of the media are allowed at 640. Thus, the short term attributes of the media may be changed.

Updates to the short term memory of the file system 520 are allowed, where the short term memory corresponds to the short term attributes of the media at 650. The controller 510 allows updates to the short term memory (e.g., the short term cache 410) of the file system 520. Updates may include any write to the media, which may include adding a new file and/or media data structures.

The short term memory of the file system 520 is refreshed each time the media is moved (mounted) to the drive 580 at 660. Refreshing the short term memory of the file system 520 may include changing data in the short term memory back to an original state for the data in the short term memory at 670 and rebuilding the data in the short term memory from the media data structures of the short term attributes each time the media is moved to the drive at 680.

In accordance with exemplary embodiments, the servers 550 and 590 may contain the same or a similar file system 520 and controller 510.

Also, the controller 510 may allow a plurality of servers to access the media of the media library 530 in the restricted update mode, where the plurality of servers each update their short term memory by making changes thereto. The plurality of servers each contain their own file system 520. Each time the media is moved to the drive, one of the plurality of servers respectively refreshes its short term memory.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While exemplary embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method for restricted update sharing of removable media in a media library, comprising:
   allowing media to be retrieved from storage slots of a media library and moved to a drive in a restricted update mode, wherein the media comprises:
      short term attributes that include short term media data structures, and
      long term attributes;
   providing a file system comprising a short term memory and a long term memory associated with the media;
   restricting updates to the long term attributes of the media;
   restricting updates to the long term memory of the file system, wherein the long term memory corresponds to the long term attributes of the media;
   allowing updates to the short term attributes of the media;
   allowing updates to the short term memory of the file system, wherein the short term memory corresponds to the short term attributes of the media; and
   refreshing the short term memory of the file system each time the media is moved to the drive, wherein refreshing the short term memory of the file system comprises:
      changing data in the short term memory of the file system back to an original state for the data in the short term memory; and
      rebuilding the data in the short term memory of the file system from the media data structures of the short term attributes each time the media is moved to the drive.

2. The method of claim 1, further comprising:
   allowing a plurality of servers to access the media of the media library in the restricted update mode, wherein:
      the plurality of servers each comprise their associated file system, and
      the plurality of servers each respectively update their short term memory by making changes thereto; and
   refreshing respectively the short term memory for at least one of the plurality of servers each time the media is moved to the drive.

* * * * *